US007675507B2

(12) United States Patent
Oda et al.

(10) Patent No.: US 7,675,507 B2
(45) Date of Patent: *Mar. 9, 2010

(54) POSITION DETECTING SYSTEM AND POSITION DETECTING APPARATUS

(75) Inventors: Yasuo Oda, Kuki (JP); Hidetaka Takiguchi, Kitakatsushika-gun (JP)

(73) Assignee: Wacom Co., Ltd., Saitama-Ken (JP)

( * ) Notice: Subject to any disclaimer, the term of this patent is extended or adjusted under 35 U.S.C. 154(b) by 971 days.

This patent is subject to a terminal disclaimer.

(21) Appl. No.: 10/949,705

(22) Filed: Sep. 27, 2004

(65) Prior Publication Data

US 2005/0104865 A1    May 19, 2005

(30) Foreign Application Priority Data

Sep. 25, 2003   (JP)   ............... 2003-333123

(51) Int. Cl.
*G06F 3/041* (2006.01)
(52) U.S. Cl. ................... 345/173; 178/18.07
(58) Field of Classification Search ................. 345/173, 345/174, 178, 179; 340/524; 178/18.01, 178/18.03, 18.07, 19.03
See application file for complete search history.

(56) References Cited

U.S. PATENT DOCUMENTS

| | | | |
|---|---|---|---|
| 4,029,899 A * | 6/1977 | Gordon | ................. 341/5 |
| 5,045,645 A | 9/1991 | Hoendervoogt et al. | |
| 5,134,253 A | 7/1992 | Doubrava | |
| 5,434,372 A * | 7/1995 | Lin | ................. 178/18.07 |
| 5,657,011 A * | 8/1997 | Komatsu et al. | ................. 341/5 |
| 5,682,019 A * | 10/1997 | Katsurahira et al. | ....... 178/18.07 |
| 5,691,511 A * | 11/1997 | Matsushima et al. | ..... 178/18.04 |
| 5,693,914 A * | 12/1997 | Ogawa | ................. 178/18.07 |
| 6,810,351 B2 * | 10/2004 | Katsurahira | ................. 702/150 |
| 2003/0001824 A1 | 1/2003 | Chao et al. | |
| 2003/0142073 A1 * | 7/2003 | Fukushima et al. | ......... 345/158 |
| 2004/0055793 A1 | 3/2004 | Chao et al. | |
| 2004/0246230 A1 * | 12/2004 | Oda et al. | ................. 345/156 |
| 2005/0171714 A1 * | 8/2005 | Ely et al. | ................. 702/75 |

FOREIGN PATENT DOCUMENTS

| | | |
|---|---|---|
| EP | 1 416 367 A2 | 5/2004 |
| JP | 63-298618 | 12/1988 |
| JP | 05088811 | 4/1993 |
| JP | 2003-67124 | * 3/2003 |
| TW | 544974 | 8/2003 |

* cited by examiner

*Primary Examiner*—Chanh Nguyen
*Assistant Examiner*—Pegeman Karimi
(74) *Attorney, Agent, or Firm*—Berenato & White, LLC

(57) ABSTRACT

A position detecting apparatus transmits position detecting signals from internal and external transmission coils, which are electrically connected to each other and are wound in opposite directions. The signals are transmitted to a position indicator that is housed within a pen-shaped input member. Since the internal and external transmission coils are wound in opposite directions, the position indicator can be efficiently excited in the entire area of a sensor unit including the end portion thereof. The position indicator receives the position detecting signals and transmits position indicating signals indicating a position. Sensor coils receive the signals from the position indicator. The position detecting apparatus detects the position of the position indicator based on the signals detected by the sensor coils.

16 Claims, 6 Drawing Sheets ized input device or the like for a computer aided design (CAD) system, a computer, a mobile phone, a personal handyphone system (PHS), a personal digital assistant (PDA), etc.

POSITION DETECTING SYSTEM AND POSITION DETECTING APPARATUS

CROSS-REFERENCE TO RELATED APPLICATIONS AND CLAIM TO PRIORITY

This application claims priority under 35 U.S.C. § 119 to application number 2003-333123, filed Sep. 25, 2003, in Japan, the disclosure of which is incorporated herein by reference.

FIELD OF THE INVENTION

The present invention relates to a position detecting apparatus which may be used as an input device or the like for a computer aided design (CAD) system, a computer, a mobile phone, a personal handyphone system (PHS), a personal digital assistant (PDA), etc. The apparatus detects a position indicated by a position indicator by using electromagnetic coupling. The present invention also relates to a position detecting system that incorporates the position indicator and the position detecting apparatus described above.

BACKGROUND OF THE INVENTION

Position detecting systems using electromagnetic coupling methods have been developed as input devices or the like for CAD systems, computers, mobile phones, and other similar applications. In this type of system, a position indicator and a position detecting apparatus transmit/receive signals to/from each other by electromagnetic coupling, so that a position indicated by the position indicator is detected by the position detecting apparatus.

For example, as described in Japanese Unexamined Patent Application Publication No. 5-88811, prior art systems include a design in which a transmission coil is provided at the peripheral portion of a sensor area of a position detecting apparatus, so that one transmission coil is provided at the peripheral portion.

FIG. 8 of Japanese Unexamined Patent Application Publication No. 5-88811 schematically shows the configuration of a sensor unit of the position detecting apparatus. In FIG. 8, a transmission coil 801 is provided around a plurality of sensor coils 802. In order to simplify the figure, only sensor coils 802 in the X direction (X-direction sensor coils) are shown, and sensor coils in the Y direction (Y-direction sensor coils) are not shown.

In FIG. 8, position-detecting signals are transmitted from the transmission coil 801 to a position indicator (not shown) by electromagnetic coupling, and then the plurality of sensor coils 802 are sequentially selected and driven. Accordingly, the plurality of sensor coils 802 sequentially receive position indicating signals from the position indicator through the electromagnetic coupling, so that the position of the position indicator is detected based on detection signals received by the plurality of sensor coils 802.

In the position detecting system described in Japanese Unexamined Patent Application Publication No. 5-88811, a transmission circuit for position detecting signals used for detecting a position can be advantageously simplified by using the single transmission coil 801.

The above-described known position detecting system has an advantage of utilizing a simple transmission circuit for driving the transmission coil 801. However, when the position indicator is positioned near a plane provided with the transmission coil 801 and the sensor coils 802 (sensor plane) but far from the transmission coil 801, the position indicator is difficult to excite. Further, a shield member is provided under the transmission coil 801 and the sensor coils 802 in order to prevent a disturbance of the magnetic field associated with the sensor coils 801, 802. Therefore, a magnetic flux output from the transmission coil 801 flows into the shield member, and thus the position indicator is difficult to excite.

Also, as in a case where the position detecting system is mounted on a mobile phone or the like, when the transmission coil 801 and the sensor coils 802 are laminated on a display device such as a liquid crystal display device, the amount of drive noise of the display device is large at the end portion of the area (sensor area) provided with the transmission coil 801 and the sensor coils 802. Therefore, excitation efficiency of the position indicator should be increased in order to eliminate the effect of the noise. In particular, an exciting current having an opposite phase to that of a current in the transmission coil 801 (exciting current flowing in the opposite direction to that of the current in the transmission coil 801) flows through a metallic bezel, which is provided at the periphery of the display device for attaching the display device. Accordingly, a magnetic flux in the opposite direction to that of the excitation for the position indicator is generated, which causes an undesirable decrease in the excitation efficiency.

SUMMARY OF THE INVENTION

The present invention has been designed in response to the above-described problems. An object of the present invention is to improve the excitation efficiency of a position indicator in an entire sensor area, including the end portion thereof, in a simply-configured position detecting system and position detecting apparatus that utilizes electromagnetic coupling.

Another object of the present invention is to alleviate the effect of a metallic bezel in a simply-configured position detecting system and position detecting apparatus that utilizes electromagnetic coupling.

According to an aspect of the present invention, a position detecting system includes a position indicator which has at least one coil and which indicates a position; and a position detecting apparatus for detecting the position indicated by the position indicator by transmitting/receiving signals to/from the position indicator by electromagnetic coupling. The position detecting apparatus includes a first transmission coil for transmitting position detecting signals to the position indicator; a second transmission coil provided in the outer side of the first transmission coil; a plurality of sensor coils for receiving signals from the position indicator; a signal transmitting unit for driving the first and second transmission coils so that the first and second transmission coils transmit position detecting signals of opposite phases; a receiving unit for sequentially selecting the plurality of sensor coils and for receiving the signals from the position indicator; and a position detecting unit for detecting the position indicated by the position indicator based on the signals received by the receiving unit.

The signal-transmitting unit drives the first and second transmission coils so that the first and second transmission coils transmit position-detecting signals of opposite phases. The position indicator receives the position detecting signals and transmits signals indicating the position of the position indicator. The receiving unit sequentially selects the plurality of sensor coils and receives the signals from the position indicator. The position-detecting unit detects the position indicated by the position indicator based on the signals from the position indicator received by the receiving unit.

The first and second transmission coils may be connected to each other and may be wound in opposite directions. The first and second transmission coils may be concentrically provided. Further, the first and second transmission coils and the sensor coils may be provided on a shield member.

The position detecting system further includes a display unit facing the first and second transmission coils; and a metallic bezel provided at the periphery of the display unit. The positional relationship and the turn ratio of the first and second transmission coils may be determined so that an exciting current generated by driving the first and second transmission coils does not flow through the metallic bezel.

Also, the number of turns of the first transmission coil may be larger than that of the second transmission coil. Further, the display unit may be a liquid crystal display device.

According to another aspect of the present invention, a position detecting apparatus detects a position indicated by a position indicator, which includes at least one coil and which indicates a position, by transmitting/receiving signals to/from the position indicator by electromagnetic coupling. The position detecting apparatus includes: a first transmission coil for transmitting position detecting signals to the position indicator; a second transmission coil provided in the outer side of the first transmission coil; a plurality of sensor coils for receiving signals from the position indicator; a signal transmitting unit for driving the first and second transmission coils so that the first and second transmission coils transmit position detecting signals of opposite phases; a receiving unit for sequentially selecting the plurality of sensor coils and for receiving the signals from the position indicator; and a position detecting unit for detecting the position indicated by the position indicator based on the signals received by the receiving unit.

The signal-transmitting unit drives the first and second transmission coils so that the first and second transmission coils transmit position-detecting signals of opposite phases. The position indicator receives the position detecting signals and transmits signals indicating the position of the position indicator. The receiving unit sequentially selects the plurality of sensor coils and receives the signals from the position indicator. The position-detecting unit detects the position indicated by the position indicator based on the signals from the position indicator received by the receiving unit.

According to the present invention, the excitation efficiency of the position indicator can be improved in the entire area of the sensor unit, including the end portion thereof, in the simply-configured position detecting system and position detecting apparatus that utilizes electromagnetic coupling.

Also, according to the present invention, the effect of the metallic bezel provided at the periphery of the display unit can be alleviated in the simply-configured position detecting system and position detecting apparatus that utilizes electromagnetic coupling.

DESCRIPTION OF THE PREFERRED EMBODIMENT(S)

A position detecting system and a position detecting apparatus according to embodiments of the present invention will be described with reference to the drawings. The position detecting system includes a position indicator having at least one coil and indicating a position; and a position detecting apparatus for detecting a position indicated by the position indicator by transmitting/receiving signals to/from the position indicator by electromagnetic coupling.

Figure 1:
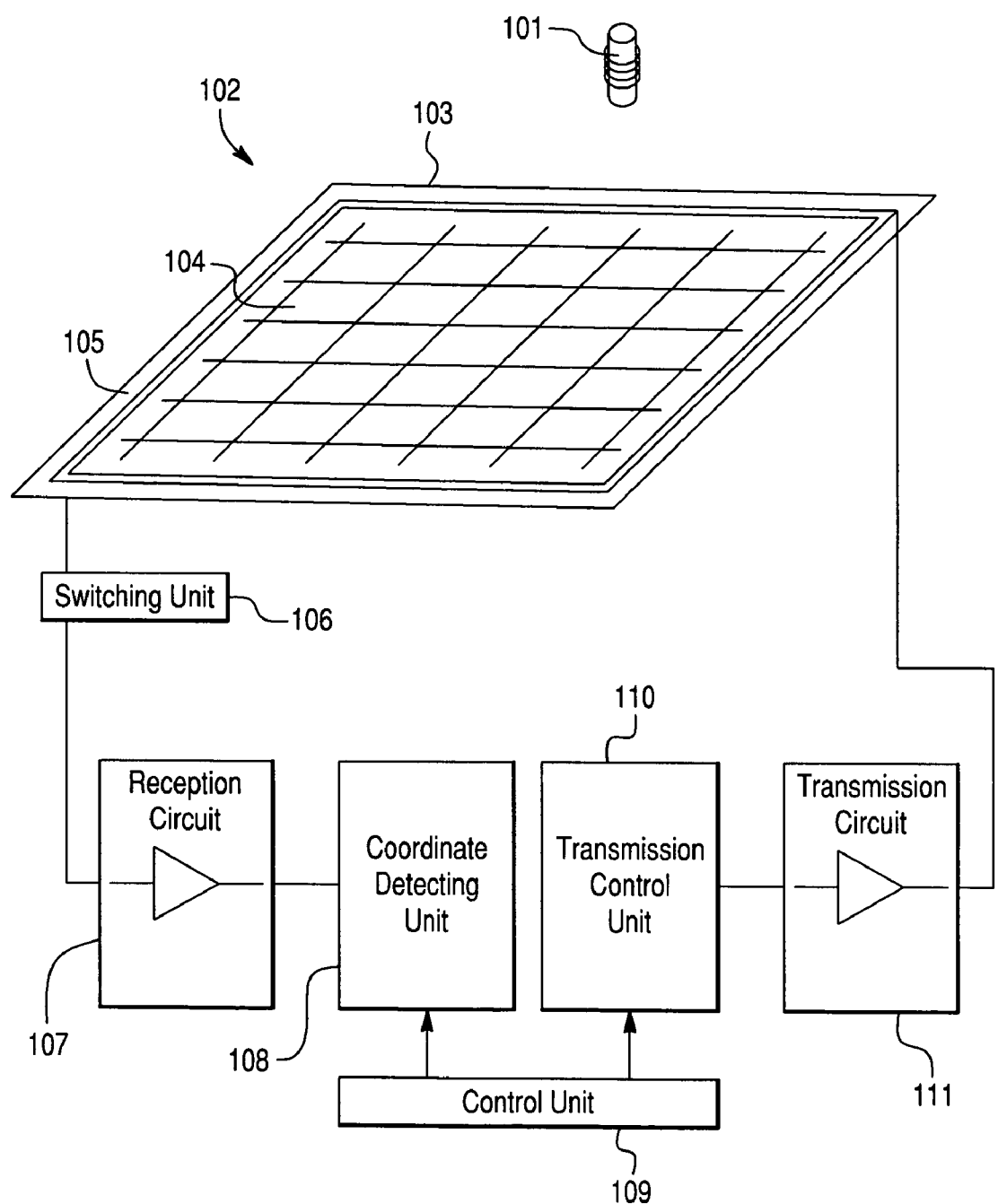
FIG. 1 is a block diagram showing a position detecting system according to a first embodiment of the present invention.

FIG. 1 is a block diagram showing the configuration of a position detecting system according to a first embodiment of the present invention. The position detecting system according to the first embodiment includes a position indicator 101 for indicating a position and a position detecting apparatus 102 for detecting the position of the position indicator 101.

The position indicator 101 includes at least one coil and indicates a position. For example, the position indicator 101 includes a coil and a capacitor connected to the coil, in which the capacitor and the coil form a resonance circuit.

The position detecting apparatus 102 includes a control unit 109, a transmission control unit 110 for generating position detecting signals, a transmission circuit 111, a sensor unit 103 serving as a sensor area, a switching unit 106 for selecting/switching sensor coils, a reception circuit 107, and a coordinate detecting unit 108.

The sensor unit 103, which extends in a plane, includes a transmission coil unit 105 for transmitting position detecting signals for detecting the position of the position indicator 101. The sensor unit 103 also includes a sensor coil unit 104 for receiving position indicating signals indicating the position of the position indicator 101. The sensor coil unit 104 includes a plurality of sensor coils (for example, n sensor coils) arranged in the X direction (X-direction sensor coils) and a plurality of sensor coils (for example, m sensor coils) arranged in the Y direction orthogonal to the X direction (Y-direction sensor coils).

The control unit 109 corresponds to the signal transmitting unit, the receiving unit, and the position-detecting unit. The transmission control unit 110 and the transmission circuit 111 correspond to the signal-transmitting unit. The switching unit 106 and the reception circuit 107 correspond to the receiving unit, and the coordinate detecting unit 108 corresponds to the position-detecting unit.

The control unit 109 controls the entire position detecting apparatus 102, and also controls the transmission control unit 110, the transmission circuit 111, the switching unit 106, the reception circuit 107, and the coordinate detecting unit 108.

The transmission control unit 110 generates position-detecting signals for detecting a position indicated by the position indicator 101 under the control of the control unit 109. The transmission circuit 111 amplifies the position detecting signals from the transmission control unit 110 and supplies the position detecting signals to the transmission coil unit 105, which is provided in the sensor unit 103. Accordingly, the transmission coil unit 105 is driven.

Figure 2:
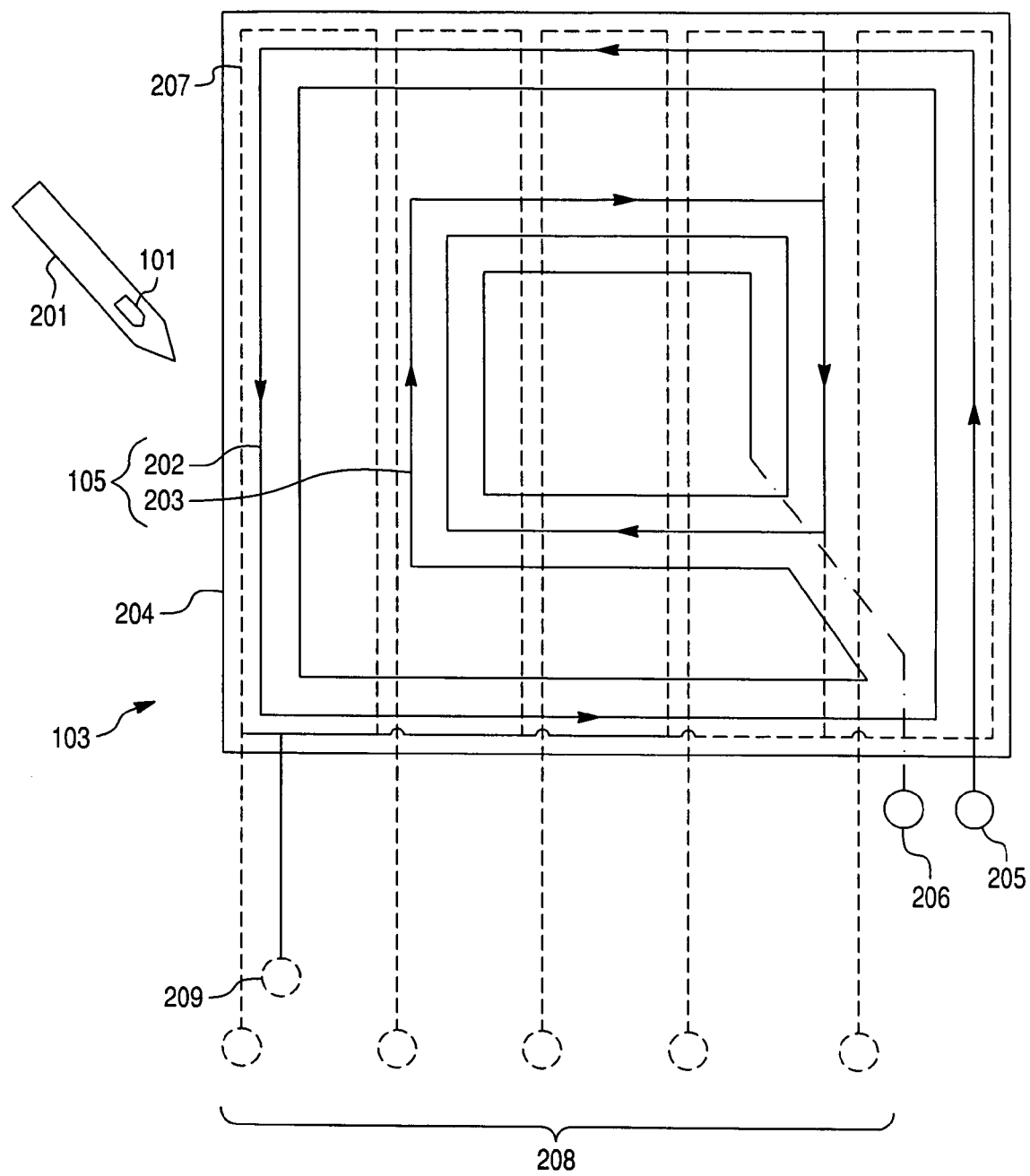
FIG. 2 is a plan view showing a specific configuration of a sensor unit used in the first embodiment of the present invention.

FIG. 2 is a plan view showing a specific configuration of the sensor unit 103. The parts in FIG. 2 that are the same as those in FIG. 1 are denoted by the same reference numerals. In FIG. 2, the position indicator 101 is incorporated into a pen-shaped input member 201. In this case, a user holds the input member 201 and indicates a position by using the position indicator 101. In this figure, only a plurality of X-direction sensor coils 207 arranged in the X direction in the sensor coil unit 104 are shown, but Y-direction sensor coils, which are arranged such that they are orthogonal to the X-direction sensor coils 207, are not shown.

In FIG. 2, the sensor unit 103 includes the transmission coil unit 105 including an external transmission coil 202 serving as a second transmission coil and an internal transmission coil 203 serving as a first transmission coil. The external transmission coil 202 and the internal transmission coil 203 are arranged so that they do not overlap each other. The external transmission coil 202 is provided in a peripheral area of the sensor unit 103 and in the outer side of the internal transmission coil 203 so as to surround the internal transmission coil 203, as best shown in FIG. 2.

The internal transmission coil 203 and the external transmission coil 202 are electrically connected to each other and are wound in opposite directions (in FIG. 2, the internal transmission coil 203 is wound clockwise, whereas the external transmission coil 202 is wound counterclockwise). Also, the internal transmission coil 203 and the external transmission coil 202 are concentrically placed and form a rectangular shape. The internal transmission coil 203 and the external transmission coil 202 are laminated on a shield member 204.

Although the details will be described in a second embodiment, the positional relationship and the turn ratio of the external transmission coil 202 and the internal transmission coil 203 are determined so that an exciting current generated by driving the external transmission coil 202 and the internal transmission coil 203 does not flow through a metallic bezel, which is provided at the periphery of a display device. In FIG. 2, the number of turns of the internal transmission coil 203 is larger than that of the external transmission coil 202.

Position detecting signals are supplied between an input terminal 205 and a common terminal 206 of the transmission coils 202 and 203 from the transmission circuit 111. Accordingly, each of the transmission coils 202, 203 is driven so as to transmit the position detecting signals to the position indicator 101. The switching unit 106 sequentially selects the sensor coils in the sensor coil unit 104 and outputs position indicating signals from the position indicator 101 to the reception circuit 107. More specifically, the switching unit 106 sequentially selects each of the X-direction sensor coils 207, extracts a position indicating signal from between an output terminal 208 for each of the selected sensor coils 207 and a common terminal 209, and then outputs the position indicating signals to the reception circuit 107.

At least one external transmission coil 202 and an internal transmission coil 203 may be provided outside the sensor coil unit 104. Alternatively, neither the external transmission coil 202 nor the internal transmission coil 203 is provided outside the sensor coil unit 104. That is, both transmission coils 202, 203 may overlap the sensor coil unit 104.

The switching unit 106 sequentially selects and scans the plurality of sensor coils in the sensor coil unit 104 and outputs a position-detecting signal detected in each selected sensor coil in the sensor coil unit 104. The position-detecting signal is directed to the reception circuit 107 under the control of the control unit 109. The reception circuit 107 amplifies the detecting signals from the switching circuit 106 and outputs the signals to the coordinate detecting unit 108 under the control of the control unit 109. The coordinate detecting unit 108 calculates the position of the position indicator 101 on the X and Y coordinates based on the position detecting signals from the reception circuit 107. Generally, the coordinate detecting unit 108 calculates the position of the position indicator 101 as indicated by the input member 201.

Figure 3:
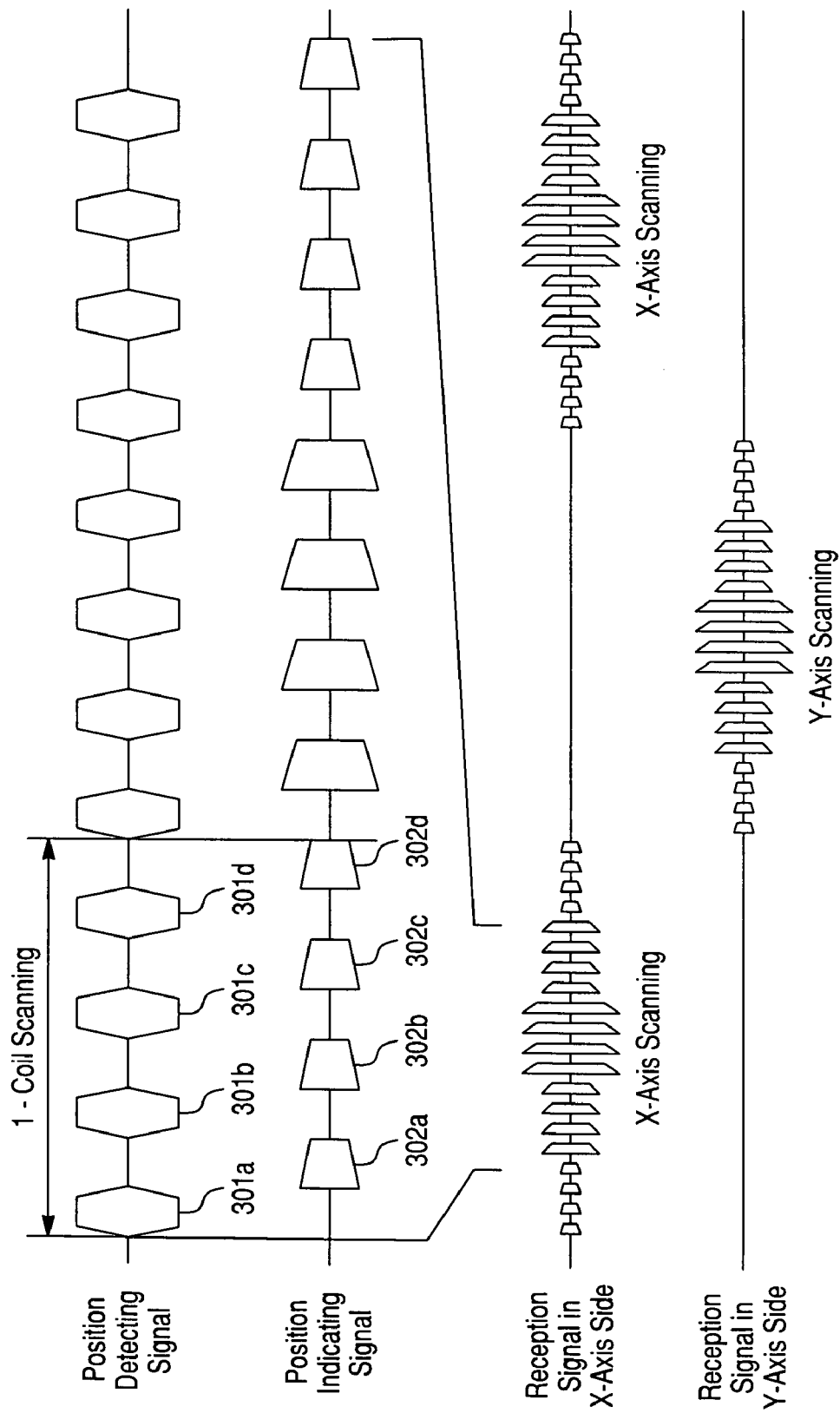
FIG. 3 is a timing chart showing the operation of the position detecting system according to the first embodiment of the present invention.

FIG. 3 is a timing chart showing the operation of the position detecting system according to the first embodiment. In this embodiment, the position of the position indicator 101 is detected by scanning the X-direction sensor coils and then scanning the Y-direction sensor coils.

Figure 4:
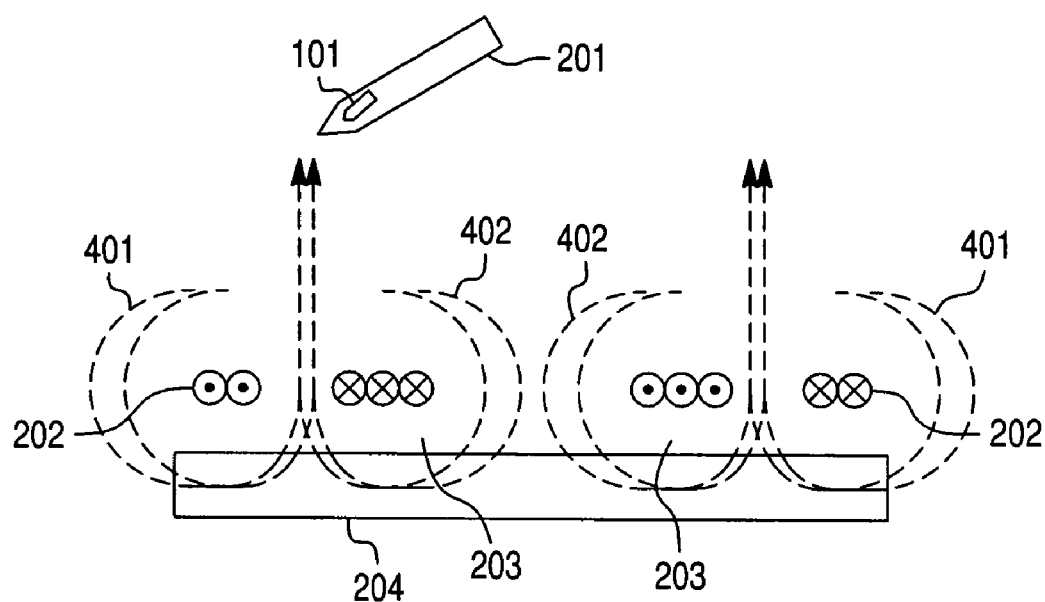
FIG. 4 is a schematic view illustrating the operation of the position detecting system according to the first embodiment of the present invention.

FIG. 4 illustrates the operation of the position detecting system according to this embodiment. Hereinafter, the operation of the position detecting system and the position detecting apparatus according to the first embodiment will be described in detail with reference to FIGS. 1 to 4.

First, the entire operation of detecting the position of the position indicator 101 by using the position detecting system will be described.

The transmission control unit 110 outputs a position-detecting signal under the control of the control unit 109. The transmission circuit 111 amplifies the position-detecting signal and outputs the signal to the transmission coil unit 105 under the control of the control unit 109. As shown in FIG. 3, a position detecting signal 301a is output from the transmission coil unit 105 (external transmission coil 202 and the internal transmission coil 203). The position indicator 101 receives the position detecting signal 301a from the transmission coil unit 105 by electromagnetic coupling and transmits a position indicating signal 302a to the position detecting apparatus 102.

In the position detecting apparatus 102 side, the control unit 109 controls the switching unit 106 so that the switching unit 106 sequentially selects and scans all the X-direction sensor coils from one end to the other (all scanning operation). Accordingly, the position indicating signal 302a is detected in an X-direction sensor coil.

The position indicating signal received by a first X-direction sensor coil 1 is regarded as an X-direction detection signal and is output through the switching unit 106 to the reception circuit 107. The X-direction detection signal is amplified by the reception circuit 107 and is then output to the coordinate detecting unit 108. The coordinate detecting unit 108 stores the level of the detection signal in a memory (not shown) serving as a storage unit provided inside the coordinate detecting unit 108.

The above-described operation is performed four times on the X-direction sensor coil 1 and the corresponding data is stored in the memory in the coordinate detecting unit 108. The coordinate detecting unit 108 stores the average of the data of the four operations stored in the memory in the coordinate detecting unit 108 in the memory, the average being regarded as the X-direction detection signal level of the X-direction sensor coil 1.

The above-described operation is sequentially performed on all the X-direction sensor coils 207 from the first sensor coil 1 to the n-th sensor coil n. Accordingly, the coordinate detecting unit 108 obtains the detection signal levels (X-direction detection signal levels) of all the X-direction sensor coils 207 and stores the obtained levels in the memory.

Then, the coordinate detecting unit 108 selects the top three levels of the detection signal levels of all the X-direction sensor coils 1 to n and calculates a maximum level by parabolic approximation by using the top three detection levels.

The coordinate at the maximum level corresponds to the X coordinate of the position indicator 101.

Then, the position detecting apparatus 102 performs the above-described operation on all the Y-direction sensor coils. That is, the control unit 109 sequentially selects and scans all the Y-direction sensor coils from one end to the other. Then, the coordinate detecting unit 108 calculates the Y coordinate of the position indicator 101 by performing the same operation as that performed on the X-direction sensor coils 207.

In this way, the coordinate detecting unit 108 detects the X and Y coordinates of the position indicator 101.

The coordinate detecting unit 108 outputs data of the detected X and Y coordinates of the position indicator 101 to the control unit 109.

After the control unit 109 has detected the position of the position indicator 101, it drives only the sensor coil unit 104 (X-direction sensor coils and Y-direction sensor coils) near the position indicator 101 while it recognizes the position of the position indicator 101, so as to perform the subsequent operation of detecting the position indicator 101 (sector scanning operation).

When the position of the position indicator 101 becomes impossible to be detected, the control unit 109 performs the above-described all scanning operation so as to detect the position of the position indicator 101 again. After that, the control unit 109 performs the sector scanning operation so as to detect the position indicator 101, and then repeats the above-described operations.

Assume that a position-detecting signal is supplied from the transmission control unit 110 and the transmission circuit 111 to the transmission coil unit 105 (external transmission coil 202 and the internal transmission coil 203). At this time, since the external transmission coil 202 and the internal transmission coil 203 are electrically connected to each other and are wound in opposite directions, currents flowing in the opposite directions flow through the external transmission coil 202 and the internal transmission coil 203. Accordingly, as show in FIG. 4, magnetic fluxes in the opposite directions are generated with the centers being the transmission coils 202, 203, and both of the transmission coils 202, 203 generate magnetic fluxes for exciting the position indicator 101. That is, a magnetic flux 401 is generated from the external transmission coil 202 and a magnetic flux 402 is generated from the internal transmission coil 203.

Accordingly, a magnetic flux passes in the side of the shield member 204 while not being directed to the position indicator 101. However, magnetic fluxes generated by the external transmission coil 202 and the internal transmission coil 203 are supplied to the position indicator 101 even near the end portion of the sensor unit 103. Accordingly, the excitation efficiency of the position indicator 101 can be improved at the end portion of the sensor unit 103 with a very simple configuration of the transmission coil unit 105, in which the external transmission coil 202 and the internal transmission coil 203 are connected while being wound in the opposite directions.

Figure 5:
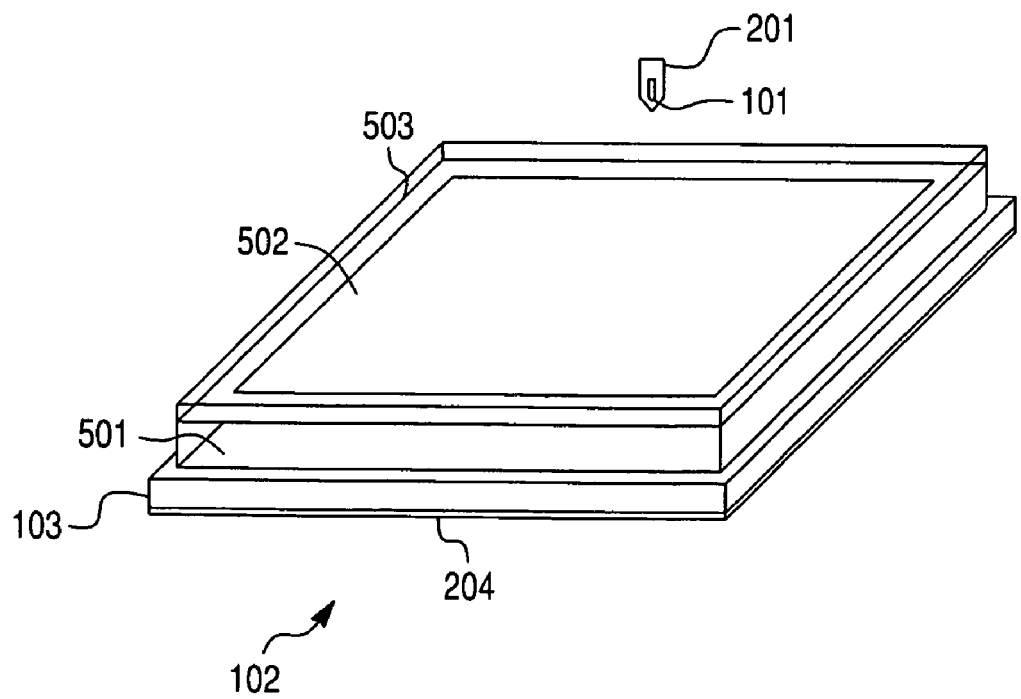
FIG. 5 is a perspective view showing the configuration of a position detecting system according to a second embodiment of the present invention.
Figure 6:
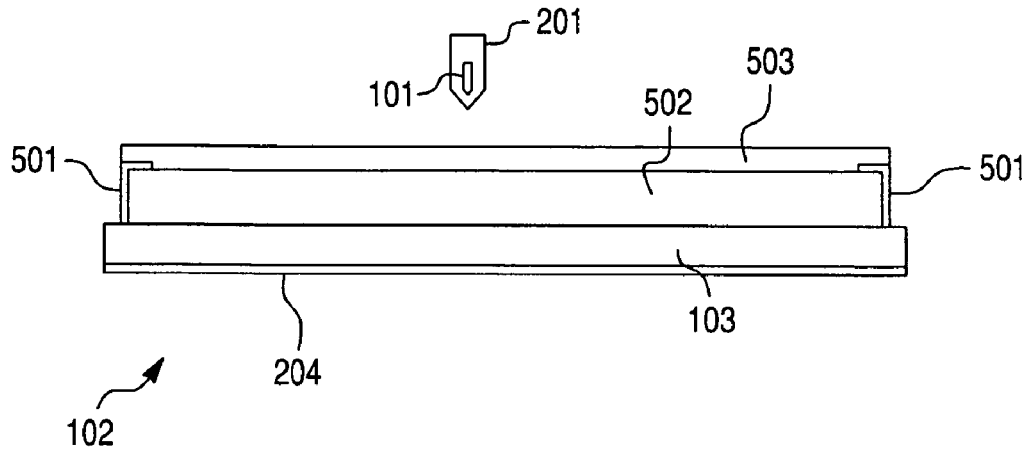
FIG. 6 is a front view showing the configuration of the position detecting system according to the second embodiment of the present invention.

FIG. 5 is a perspective view showing the configuration of a position detecting system according to a second embodiment of the present invention, and FIG. 6 is a front view showing the configuration of the position detecting system according to the second embodiment. In these figures, parts which are the same as those in FIGS. 1 to 4 are denoted by the same reference numerals.

In the position detecting system according to the second embodiment, a display device is laminated on the position detecting apparatus 102 of the first embodiment.

In FIGS. 5 and 6, a display device, such as liquid crystal display device 502, is laminated on the sensor unit 103 on the shield member 204 of the position detecting apparatus 102. A protective glass 503 is provided on the front surface of the liquid crystal display device 502 and a rectangular metallic bezel 501 is provided at the periphery of the liquid crystal display device 502. The metallic bezel 501 is provided so as to face the periphery of the sensor unit 103 and fixes the liquid crystal display device at the periphery of the sensor unit 103.

As described in the first embodiment, the internal transmission coil 203 and the external transmission coil 202 of the sensor unit 103 are electrically connected to each other and are wound in opposite directions. Also, the internal transmission coil 203 and the external transmission coil 202 are concentrically provided and form a rectangular shape. The internal transmission coil 203 and the external transmission coil 202 are laminated on the shield member 204.

The positional relationship and the turn ratio of the external transmission coil 202 and the internal transmission coil 203 are determined so that an exciting current generated by driving the external transmission coil 202 and the internal transmission coil 203 does not flow through the metallic bezel 501 provided at the periphery of the liquid crystal display device 502. That is, the positional relationship and the turn ratio of the external transmission coil 202 and the internal transmission coil 203 are determined so that the sum of magnetic fluxes which are generated by the external transmission coil 202 and the internal transmission coil 203 and which interlink the metallic bezel 501 becomes zero.

In the example shown in FIG. 2, since the area of the internal transmission coil 203 is smaller than that of the external transmission coil 202, the number of interlinked magnetic fluxes in each turn of the internal transmission coil 203 is smaller than that of the external transmission coil 202, viewed from the side of the metallic bezel 501. Therefore, the number of turns of the internal transmission coil 203 is larger than that of the external transmission coil 202 so that the numbers of magnetic fluxes which are generated in the internal transmission coil 203 and in the external transmission coil 202 by the same current and which interlink the metallic bezel 501 are the same (however, the directions are opposite). When the metallic bezel 501 exists in the inner side of the external transmission coil 202, the number of turns of the external transmission coil 202 may have to be larger than that of the internal transmission coil 203.

Figure 7:
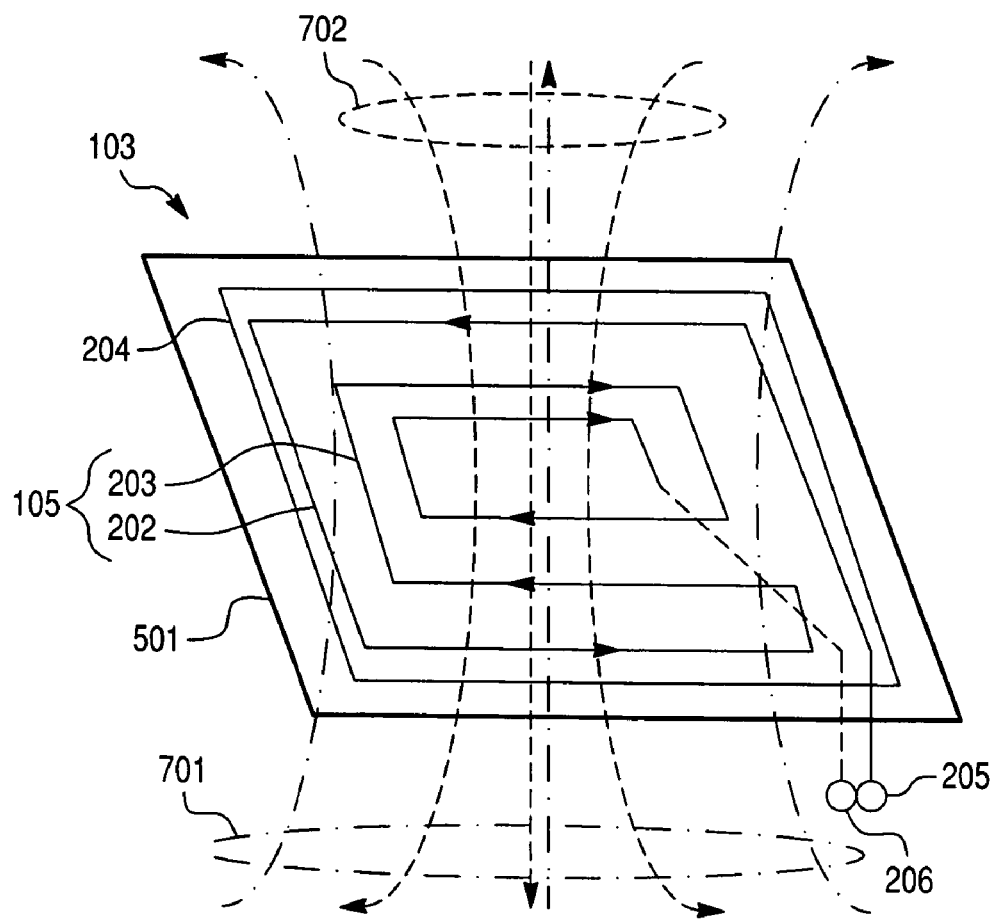
FIG. 7 illustrates the operation of the position detecting system according to the second embodiment of the present invention.
Figure 8:
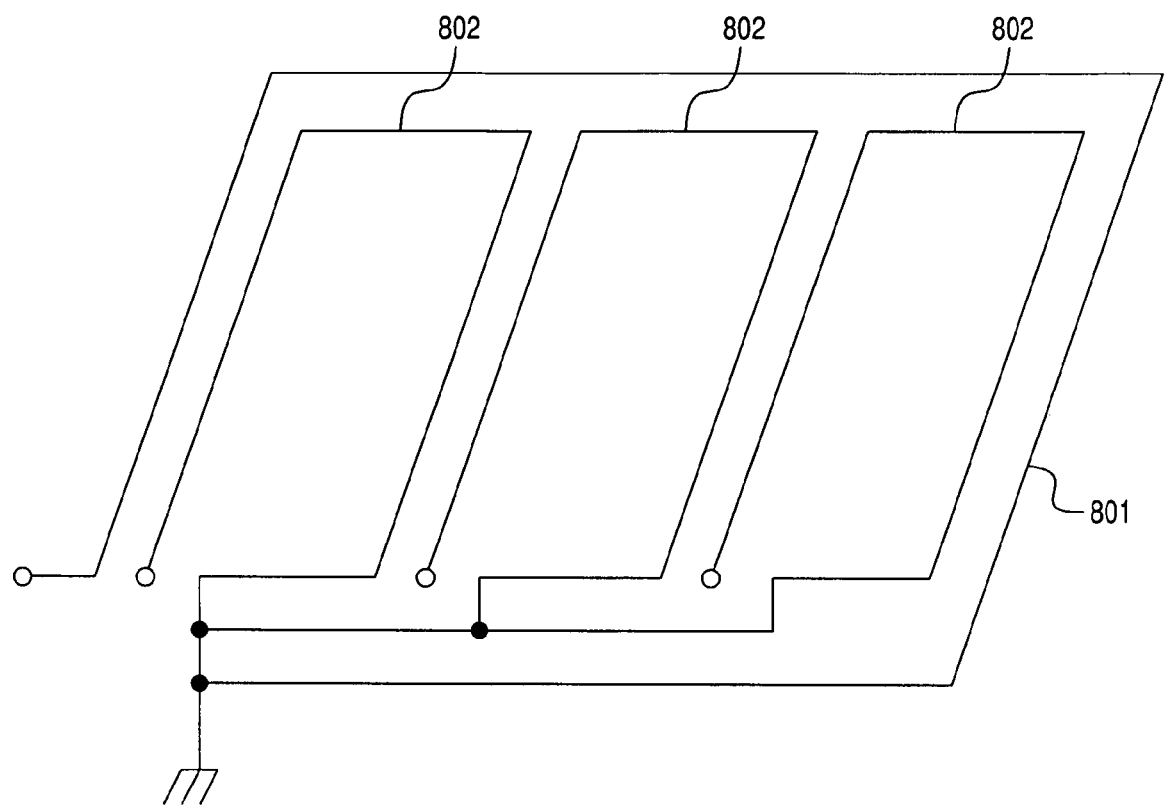
FIG. 8 is a schematic view illustrating the operation of a known position detecting system.

FIG. 7 illustrates the operation of the second embodiment. In this figure, parts which are the same as those in FIGS. 1 to 6 are denoted by the same reference numerals.

The operation of the position detecting system and the position detecting apparatus having the above-described configuration according to the second embodiment will be described with reference to FIGS. 5 to 7 (also FIGS. 1 to 4 if necessary). A basic operation of the position detecting apparatus 102 of detecting the position of the position indicator 101 is the same as in the first embodiment. Therefore, the description of the basic operation of detecting the position will be omitted and only an operation in which the effect of the metallic bezel 501 is suppressed will be described.

As shown in FIG. 7, the external transmission coil 202 and the internal transmission coil 203 included in the transmission coil unit 105 are wound in the opposite directions. Therefore, when a position detecting signal is supplied from the transmission control unit 110 and the transmission circuit 111 to the transmission coil unit 105 so as to supply driving currents in the directions indicated by arrows, the external transmission coil 202 generates a magnetic flux 701 and the internal transmission coil 203 generates a magnetic flux 702 in mutually opposite directions.

At this time, since the positional relationship and the turn ratio of the external transmission coil 202 and the internal transmission coil 203 are determined so that an exciting current generated by driving the external transmission coil 202 and the internal transmission coil 203 does not flow through the metallic bezel 501, the magnetic fluxes 701 and 702 which are generated by the external transmission coil 202 and the internal transmission coil 203 and which interlink the metallic bezel 501 are offset so as to reach zero, and thus an exciting current is not generated in the metallic bezel 501. Therefore, a magnetic flux which reduces the magnetic fluxes 701 and 702 generated from the transmission coils 202 and 203 is not generated from the metallic bezel 501, and thus the excitation efficiency of the position indicator 101 does not decrease.

As described above, the position detecting system according to the embodiments of the present invention includes the position indicator 101 which has at least one coil and which indicates a position; and the position detecting apparatus 102 for detecting the position indicated by the position indicator 101 by transmitting/receiving signals to/from the position indicator 101 by electromagnetic coupling. The position detecting apparatus 102 includes the internal transmission coil 203 for transmitting position detecting signals to the position indicator 101; the external transmission coil 202 provided in the outer side of the internal transmission coil 203; the plurality of sensor coils in the sensor coil unit 104 for receiving signals from the position indicator 101; the signal transmitting unit for driving the internal and external transmission coils 203 and 202 so that the internal and external transmission coils 203 and 202 transmit position detecting signals of opposite phases; the receiving unit for sequentially selecting the plurality of sensor coils in the sensor coil unit 104 and for receiving the signals from the position indicator 101; and the position detecting unit for detecting the position indicated by the position indicator 101 based on the signals received by the receiving unit.

Herein, the internal transmission coil 203 and the external transmission coil 202 are connected to each other and are wound in opposite directions. Also, the internal transmission coil 203 and the external transmission coil 202 are concentrically placed and form a rectangular shape as the sensor unit 103. The sensor unit 103, which includes the internal transmission coil 203, the external transmission coil 202, and the sensor coil unit 104, is provided on the shield member 204.

Also, the position detecting system includes the display device 502 such as a liquid crystal display device, which faces the internal transmission coil 203 and the external transmission coil 202, and the metallic bezel 501 provided at the periphery of the display device 502. The positional relationship and the turn ratio of the internal transmission coil 203 and the external transmission coil 202 are determined so that an exciting current generated by driving the internal transmission coil 203 and the external transmission coil 202 does not flow through the metallic bezel 501. The number of turns of the internal transmission coil 203 is larger than that of the external transmission coil 202.

Accordingly, with a simple configuration of the position detecting system using electromagnetic coupling, in which the internal transmission coil 203 and the external transmission coil 202 are wound in opposite directions, the excitation efficiency of the position indicator 101 can be improved in the entire area of the sensor unit 103 including the end portion thereof. Also, with this simple configuration, the effect of the metallic bezel 501, which is provided at the periphery of the display device 502, can be alleviated.

Also, since the positional relationship and the turn ratio of the internal transmission coil 203 and the external transmission coil 202 are adjusted so that an exciting current does not flow through the metallic bezel 501 of the liquid crystal display device 502 disposed on the sensor unit 103, an overcurrent hardly flows through the metallic bezel 501. Accordingly, a decrease in the excitation efficiency of the position indicator 101 can be suppressed.

The position detecting apparatus 102 according to the embodiments of the present invention detects a position indicated by the position indicator 101, which includes at least one coil and which indicates a position, by transmitting/receiving signals to/from the position indicator 101 by electromagnetic coupling. The position detecting apparatus 102 includes: the internal transmission coil 203 for transmitting position detecting signals to the position indicator 101; the external transmission coil 202 provided in the outer side of the internal transmission coil 203; the plurality of sensor coils in the sensor coil unit 104 for receiving signals from the position indicator 101; the signal transmitting unit for driving the internal and external transmission coils 203, 202 so that the internal and external transmission coils 203, 202 transmit position detecting signals of opposite phases; the receiving unit for sequentially selecting the plurality of sensor coils in the sensor coil unit 104 and for receiving the signals from the position indicator 101; and the position detecting unit for detecting the position indicated by the position indicator 101 based on the signals received by the receiving unit.

Accordingly, with a simple configuration of the position detecting apparatus using electromagnetic coupling, in which the internal and external transmission coils are wound in the opposite directions, the excitation efficiency of the position indicator 101 can be improved in the entire area of the sensor unit 103 including the end portion thereof. Also, with this simple configuration of the position detecting apparatus using electromagnetic coupling, the effect of the metallic bezel 501, which is provided at the periphery of the display device 502, can be alleviated.

In the above-described embodiments, the external transmission coil 202 and the internal transmission coil 203 are electrically connected so as to simplify the configuration. However, these transmission coils may be electrically disconnected and each transmission coil may be driven so as to generate the same magnetic flux as that in the above-described embodiments.

Also, the transmission coil unit 105 and the sensor coil unit 104 may be individually formed and placed. That is, they may not be formed and placed in the same apparatus but they may be individually formed and placed on individual substrates.

Further, the transmission coil unit 105 is not limited to a copper foil pattern, but various modifications can be used. For example, a wound conductive wire may be used or a printed pattern may be used.

Further, although a liquid crystal display device is used as the display device 502, the present invention can be applied to another type of display device, such as an electroluminescence (EL) display device.

The present invention can be applied to a position detecting system for detecting at least the position of a position indicator. Also, the present invention can be applied to a position detecting system for detecting not only the position of a position indicator but also the attitude thereof.

What we claim is:

1. A position detecting system comprising:
a position indicator which has at least one coil and which indicates a position; and a position detecting apparatus for detecting the position indicated by the position indicator by transmitting/receiving signals to/from the position indicator by electromagnetic coupling, wherein the position detecting apparatus comprises:
a first transmission coil for transmitting position detecting signals to the position indicator;
a second transmission coil concentrically surrounding said first transmission coil for transmitting position detecting signals to the position indicator, said second transmission coil being connected in series to said first transmission coil and wound in the opposite direction;
a plurality of sensor coils for receiving signals from the position indicator, said sensor coils being different than said first and second transmission coils;
a signal transmitter operatively associated with and driving the first and second transmission coils so that the first and second transmission coils transmit position detecting signals of opposite phases;
a receiver for sequentially selecting the plurality of sensor coils and for receiving the signals from the position indicator; and
a position detecting unit for detecting the position indicated by the position indicator based on the signals received by the receiver.

2. A position detecting system according to claim 1, wherein the first and second transmission coils and the sensor coils are provided on a shield member.

3. A position detecting system according to claim 1, further comprising:
a display facing the first and second transmission coils; and
a metallic bezel provided at the periphery of the display,
wherein a positional relationship and a turn ratio of the first and second transmission coils are determined so that an exciting current generated by driving the first and second transmission coils does not flow through the metallic bezel.

4. A position detecting system according to claim 3, wherein the number of turns of the first transmission coil is larger than that of the second transmission coil.

5. A position detecting system according to claim 3, wherein the display is a liquid crystal display device.

6. A position detecting system according to claim 1, wherein the sensor coils comprise a first plurality of sensor coils arranged in an X-direction and a second plurality of sensor coils arranged in a Y-direction perpendicular to the X-direction, the first and second sensor coils crossing one another.

7. A position detecting apparatus for detecting a position indicated by a position indicator, which includes at least one coil and which indicates a position, by transmitting/receiving signals to/from the position indicator by electromagnetic coupling, the apparatus comprising:
a first transmission coil for transmitting position detecting signals to the position indicator;
a second transmission coil concentrically surrounding said first transmission coil for transmitting position detecting signals to the position indicator, said second transmission coil being connected in series to said first transmission coil absent discontinuities and wound in a direction opposite to the direction in which said first coil is wound;
a plurality of sensor coils for receiving signals from the position indicator, said sensor coils being different than said first and second transmission coils;
signal transmitting means operatively associated with and driving the first and second transmission coils so that the first and second transmission coils transmit position detecting signals of opposite phases;
receiving means for sequentially selecting the plurality of sensor coils and for receiving the signals from the position indicator; and
position detecting means for detecting the position indicated by the position indicator based on the signals received by the receiving means.

8. A position detecting apparatus according to claim 7, wherein the first and second transmission coils and the sensor coils are provided on a shield member.

9. A position detecting apparatus according to claim 7, further comprising:
display means facing the first and second transmission coils; and
a metallic bezel provided at the periphery of the display means,
wherein a positional relationship and a turn ratio of the first and second transmission coils are determined so that an exciting current generated by driving the first and second transmission coils does not flow through the metallic bezel.

10. A position detecting apparatus according to claim 9, wherein the number of turns of the first transmission coil is larger than that of the second transmission coil.

11. A position detecting apparatus according to claim 9, wherein the display means is a liquid crystal display device.

12. A method of detecting position signals, comprising the steps of:
providing a position detecting system having a position indicator with at least one coil and which indicates a position, and a position detecting apparatus comprising a first transmission coil for transmitting position detecting signals to the position indicator, a second transmission coil concentrically surrounding the first transmission coil for transmitting position detecting signals to the position indicator, said second transmission coil being connected in series to said first transmission coil and wound in the opposite direction, a plurality of sensor coils for receiving signals from the position indicator, said sensor coils and being different than said first and second transmission coils, a signal transmitter operatively associated with and driving the first and second transmission coils so that the first and second transmission coils transmit position detecting signals of opposite phases;
sequentially selecting the plurality of sensor coils receiving the signals from the position indicator; and
detecting the position indicated by the position indicator based on the signals received by the position detecting apparatus.

13. A position detecting apparatus for communication with a position indicator, said apparatus comprising:
a plurality of sensor coils defining a sensor area having an internal region surrounded by a peripheral region, said sensor coils for receiving position indicating signals from the position indicator;
an internal transmission coil for transmitting position detecting signals to the position indicator, said internal transmission coil wound around said internal region;
an external transmission coil for transmitting position detecting signals to the position indicator, said external transmission coil wound around said peripheral region and concentrically surrounding the internal transmission coil;
a transmission unit operatively associated with and driving said first and second transmission coils so that said first and second transmission coils transmit position detecting signals to the position indicator; and a position detecting unit for detecting a position indicated by the position indicator based on the position indicating signals received by said sensor coils, wherein said internal and external transmission coils are connected to each other in series absent discontinuities and wound in opposing directions to allow electric current to flow around said internal and peripheral regions, respectively, in opposite directions.

14. A position detecting apparatus according to claim 13, wherein the internal and external transmission coils are connected to each other and are wound in the opposite directions.

15. A position detecting apparatus according to claim 13, wherein the sensor coils comprise a first plurality of sensor coils arranged in an X-direction and a second plurality of sensor coils arranged in a Y-direction perpendicular to the X-direction, the first and second sensor coils crossing one another.

16. A position detecting system having a position detecting apparatus and a stylus type pointing device having at least one coil for signal reception from the position detecting apparatus comprising:

a pointing device operably associated with a position detecting apparatus; a first transmission coil positioned within the detecting apparatus for exciting a coil of the pointing device a second transmission coil positioned within the detecting apparatus for exciting the coil of the pointing device coil, said first and second transmission coils are arranged concentrically in series absent discontinuities and wound in opposing directions, wherein the second transmission coil concentrically surrounding said first transmission coil for transmitting position detecting signals to the pointing device, and the signals flowing through said first and second coils have phases opposite to each other.

* * * * *